(12) United States Patent
Rodriguez

(10) Patent No.: US 8,326,131 B2
(45) Date of Patent: Dec. 4, 2012

(54) SIGNALLING OF DECODABLE SUB-SEQUENCES

(75) Inventor: Arturo A. Rodriguez, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 367 days.

(21) Appl. No.: 12/709,851

(22) Filed: Feb. 22, 2010

(65) Prior Publication Data

US 2010/0215338 A1 Aug. 26, 2010

Related U.S. Application Data

(60) Provisional application No. 61/154,355, filed on Feb. 20, 2009.

(51) Int. Cl.
*H04N 5/92* (2006.01)
*H04N 5/783* (2006.01)

(52) U.S. Cl. ........ 386/326; 386/343; 386/344; 386/345; 386/346; 386/347; 386/348; 386/350; 386/351

(58) Field of Classification Search .................. 386/326, 386/343, 344, 345, 346, 347, 348, 350, 351
See application file for complete search history.

(56) References Cited

U.S. PATENT DOCUMENTS

| | | | |
|---|---|---|---|
| 5,440,345 A | 8/1995 | Shimoda | |
| 5,606,359 A | 2/1997 | Youden et al. | |
| 5,734,443 A | 3/1998 | O'Grady | |
| 5,734,783 A | 3/1998 | Shimoda et al. | |
| 5,828,370 A | 10/1998 | Moeller et al. | |
| 5,917,830 A | 6/1999 | Chen et al. | |
| 5,917,988 A | 6/1999 | Eto | |
| 5,943,447 A | 8/1999 | Tkhor et al. | |
| 5,949,948 A | 9/1999 | Krause et al. | |
| 5,963,260 A | 10/1999 | Bakhmutsky | |
| 6,188,436 B1 | 2/2001 | Williams et al. | |
| 6,201,927 B1 | 3/2001 | Commer | |

(Continued)

FOREIGN PATENT DOCUMENTS

EP 0 812 112 A2 12/1997

(Continued)

OTHER PUBLICATIONS

Tian et al., "Sub-Sequence Video Coding for Improved Temporal Scalability", 4 pages.

(Continued)

*Primary Examiner* — Daquan Zhao
(74) *Attorney, Agent, or Firm* — Merchant & Gould

(57) ABSTRACT

In one embodiment, providing a transport stream including a video stream that comprises a sequence of pictures corresponding to a video program, each of the pictures of the sequence uniquely associated with one of k successive tiers, where k is a non-negative integer number starting with a lowest tier number; and providing personal video recording assist (PVRA) information in the transport stream at a location corresponding to each of the pictures of the sequence associated with a first tier and each of the pictures of the sequence associated with a second tier different than the first tier, the PVRA information comprising an indication of a first tier number corresponding uniquely to the pictures associated with the first tier and a second tier number corresponding uniquely to the pictures associated with the second tier, the pictures corresponding to the first tier number decodable independently of the pictures corresponding to the second tier number.

16 Claims, 6 Drawing Sheets

U.S. PATENT DOCUMENTS

| | | |
|---|---|---|
| 6,222,979 B1 | 4/2001 | Willis et al. |
| 6,304,714 B1 | 10/2001 | Krause et al. |
| 6,393,057 B1 | 5/2002 | Thoreau et al. |
| 6,421,387 B1 | 7/2002 | Rhee |
| 6,512,552 B1 | 1/2003 | Subramanian |
| 6,594,798 B1 | 7/2003 | Chou et al. |
| 6,658,199 B1 | 12/2003 | Hallberg |
| 6,806,909 B1 | 10/2004 | Radha et al. |
| 6,907,075 B2 | 6/2005 | Felts et al. |
| 6,909,743 B1 | 6/2005 | Ward et al. |
| 6,912,251 B1 | 6/2005 | Ward et al. |
| 6,980,594 B2 | 12/2005 | Wang et al. |
| 7,027,713 B1 * | 4/2006 | Hallberg .................. 386/346 |
| 7,050,603 B2 | 5/2006 | Rhoads et al. |
| 7,053,874 B2 | 5/2006 | Koyama |
| 7,085,322 B2 | 8/2006 | Ngai et al. |
| 7,095,783 B1 | 8/2006 | Sotheran et al. |
| 7,096,482 B2 | 8/2006 | Forecast et al. |
| 7,129,962 B1 | 10/2006 | Cote et al. |
| 7,185,018 B2 | 2/2007 | Archbold |
| 7,236,520 B2 | 6/2007 | Kim et al. |
| 7,243,193 B2 | 7/2007 | Walmsley |
| 7,317,839 B2 | 1/2008 | Holcomb |
| 7,397,858 B2 | 7/2008 | Garrido et al. |
| 7,480,335 B2 | 1/2009 | Payson |
| 7,577,198 B2 | 8/2009 | Holcomb |
| 7,584,495 B2 | 9/2009 | Hannuksela et al. |
| 7,590,180 B2 | 9/2009 | Kang |
| 7,599,435 B2 | 10/2009 | Marpe et al. |
| 7,599,438 B2 | 10/2009 | Holcomb |
| 7,606,308 B2 | 10/2009 | Holcomb |
| 7,616,692 B2 | 11/2009 | Holcomb |
| 7,620,106 B2 | 11/2009 | Holcomb |
| 7,623,574 B2 | 11/2009 | Holcomb |
| 7,649,937 B2 | 1/2010 | Rabenold et al. |
| 7,656,410 B2 | 2/2010 | Chiu |
| 7,809,059 B2 * | 10/2010 | Yin et al. ............... 375/240.12 |
| 7,809,060 B2 * | 10/2010 | Toma et al. ............. 375/240.14 |
| 7,889,788 B2 | 2/2011 | Toma et al. |
| 7,903,743 B2 | 3/2011 | Ho |
| 2002/0075402 A1 | 6/2002 | Robson et al. |
| 2002/0149591 A1 | 10/2002 | Van Der Vleuten et al. |
| 2002/0162111 A1 | 10/2002 | Shimizu et al. |
| 2002/0176025 A1 | 11/2002 | Kim |
| 2002/0178444 A1 | 11/2002 | Trajkovic et al. |
| 2003/0012554 A1 | 1/2003 | Zeidler et al. |
| 2003/0043847 A1 | 3/2003 | Haddad |
| 2003/0072555 A1 | 4/2003 | Yap et al. |
| 2003/0081934 A1 | 5/2003 | Kirmuss |
| 2003/0093418 A1 | 5/2003 | Archbold |
| 2003/0093800 A1 | 5/2003 | Demas et al. |
| 2003/0113098 A1 | 6/2003 | Willis |
| 2003/0123849 A1 | 7/2003 | Nallur |
| 2003/0161407 A1 | 8/2003 | Murdock et al. |
| 2003/0189982 A1 | 10/2003 | MacInnis |
| 2004/0078186 A1 | 4/2004 | Nair |
| 2004/0128578 A1 | 7/2004 | Jonnalagadda |
| 2004/0133908 A1 | 7/2004 | Smith et al. |
| 2004/0177369 A1 | 9/2004 | Akins |
| 2004/0179619 A1 | 9/2004 | Tian et al. |
| 2004/0210925 A1 | 10/2004 | Miyazawa et al. |
| 2004/0218816 A1 | 11/2004 | Hannuksela |
| 2005/0002574 A1 | 1/2005 | Fukuhara et al. |
| 2005/0013249 A1 | 1/2005 | Kong et al. |
| 2005/0022245 A1 | 1/2005 | Nallur et al. |
| 2005/0053134 A1 | 3/2005 | Holcomb |
| 2005/0053140 A1 | 3/2005 | Holcomb |
| 2005/0053141 A1 | 3/2005 | Holcomb |
| 2005/0053142 A1 | 3/2005 | Holcomb |
| 2005/0053143 A1 | 3/2005 | Holcomb |
| 2005/0053144 A1 | 3/2005 | Holcomb |
| 2005/0053155 A1 | 3/2005 | Holcomb |
| 2005/0053295 A1 | 3/2005 | Holcomb |
| 2005/0069212 A1 | 3/2005 | Bottreau et al. |
| 2005/0123056 A1 | 6/2005 | Wang |
| 2005/0175098 A1 | 8/2005 | Narasimhan et al. |
| 2005/0190774 A1 | 9/2005 | Wiegand |
| 2005/0207733 A1 | 9/2005 | Gargi |
| 2005/0229225 A1 | 10/2005 | Klausberger et al. |
| 2006/0013305 A1 | 1/2006 | Sun |
| 2006/0072597 A1 | 4/2006 | Hannuksela |
| 2006/0083298 A1 | 4/2006 | Wang |
| 2006/0083311 A1 | 4/2006 | Winger |
| 2006/0093045 A1 | 5/2006 | Anderson et al. |
| 2006/0093315 A1 | 5/2006 | Kelly et al. |
| 2006/0117357 A1 * | 6/2006 | Surline ...................... 725/90 |
| 2006/0126728 A1 | 6/2006 | Yu et al. |
| 2006/0129914 A1 | 6/2006 | Ellis |
| 2006/0132822 A1 | 6/2006 | Walmsley |
| 2006/0147121 A1 | 7/2006 | Maeda et al. |
| 2006/0222319 A1 | 10/2006 | Russ |
| 2006/0224763 A1 | 10/2006 | Altunbasak et al. |
| 2006/0294171 A1 | 12/2006 | Bossen |
| 2007/0019724 A1 | 1/2007 | Tourapis |
| 2007/0030186 A1 | 2/2007 | Archbold |
| 2007/0030356 A1 | 2/2007 | Yea |
| 2007/0030818 A1 | 2/2007 | Bahnck |
| 2007/0031110 A1 | 2/2007 | Rijckaert |
| 2007/0091997 A1 | 4/2007 | Fogg et al. |
| 2007/0109409 A1 | 5/2007 | Yea |
| 2007/0112721 A1 | 5/2007 | Archbold |
| 2007/0116426 A1 | 5/2007 | Toma et al. |
| 2007/0121721 A1 | 5/2007 | Kim et al. |
| 2007/0133674 A1 | 6/2007 | Garnier et al. |
| 2007/0140358 A1 | 6/2007 | Schwartz et al. |
| 2007/0153679 A1 | 7/2007 | Jost |
| 2007/0172133 A1 | 7/2007 | Kim |
| 2007/0183494 A1 | 8/2007 | Hannuksela |
| 2007/0194975 A1 | 8/2007 | Jang et al. |
| 2007/0223595 A1 | 9/2007 | Hannuksela et al. |
| 2007/0230496 A1 | 10/2007 | Guo et al. |
| 2007/0245382 A1 | 10/2007 | Doi et al. |
| 2007/0280350 A1 | 12/2007 | Mathew et al. |
| 2008/0025399 A1 | 1/2008 | Le Leannec et al. |
| 2008/0055463 A1 | 3/2008 | Lerner |
| 2008/0056383 A1 | 3/2008 | Ueki et al. |
| 2008/0063074 A1 | 3/2008 | Gallant et al. |
| 2008/0115175 A1 | 5/2008 | Rodriguez |
| 2008/0115176 A1 | 5/2008 | Rodriguez |
| 2008/0117985 A1 | 5/2008 | Chen |
| 2008/0127255 A1 | 5/2008 | Ress et al. |
| 2008/0131079 A1 | 6/2008 | Toma |
| 2008/0137742 A1 | 6/2008 | Chen |
| 2008/0141091 A1 | 6/2008 | Kalluri |
| 2008/0152005 A1 | 6/2008 | Oguz et al. |
| 2008/0163308 A1 | 7/2008 | Kim |
| 2008/0192817 A1 | 8/2008 | Llach et al. |
| 2008/0225850 A1 | 9/2008 | Oran et al. |
| 2008/0225951 A1 | 9/2008 | Young |
| 2008/0247463 A1 | 10/2008 | Buttimer |
| 2008/0256409 A1 | 10/2008 | Oran et al. |
| 2008/0260045 A1 | 10/2008 | Rodriguez |
| 2008/0311869 A1 | 12/2008 | Koga et al. |
| 2008/0320558 A1 | 12/2008 | Imanishi et al. |
| 2009/0002379 A1 | 1/2009 | Baeza |
| 2009/0003446 A1 | 1/2009 | Wu |
| 2009/0003447 A1 | 1/2009 | Christoffersen |
| 2009/0028247 A1 | 1/2009 | Shuh |
| 2009/0034627 A1 | 2/2009 | Rodriguez et al. |
| 2009/0034633 A1 | 2/2009 | Rodirguez et al. |
| 2009/0073928 A1 | 3/2009 | Power |
| 2009/0100482 A1 | 4/2009 | Rodriguez et al. |
| 2009/0103635 A1 | 4/2009 | Pahalawatta |
| 2009/0109342 A1 | 4/2009 | Heng et al. |
| 2009/0116558 A1 | 5/2009 | Chen |
| 2009/0138668 A1 | 5/2009 | Blankenship |
| 2009/0141168 A1 | 6/2009 | Chen et al. |
| 2009/0148056 A1 | 6/2009 | Rodriguez et al. |
| 2009/0148132 A1 | 6/2009 | Rodriguez et al. |
| 2009/0154560 A1 | 6/2009 | Hong |
| 2009/0154563 A1 | 6/2009 | Hong |
| 2009/0161770 A1 | 6/2009 | Dong |
| 2009/0180546 A1 | 7/2009 | Rodriguez et al. |
| 2009/0180547 A1 | 7/2009 | Rodriguez et al. |
| 2009/0190655 A1 | 7/2009 | Shimada |
| 2009/0190849 A1 | 7/2009 | Huang |
| 2009/0199231 A1 | 8/2009 | Tsuria et al. |

| | | | |
|---|---|---|---|
| 2009/0207904 | A1 | 8/2009 | Pandit et al. |
| 2009/0210412 | A1 | 8/2009 | Oliver |
| 2009/0214178 | A1 | 8/2009 | Takahashi |
| 2009/0220012 | A1 | 9/2009 | Rodriguez et al. |
| 2009/0226105 | A1 | 9/2009 | Huang |
| 2009/0262804 | A1 | 10/2009 | Pandit |
| 2009/0279608 | A1 | 11/2009 | Jeon |
| 2009/0296811 | A1 | 12/2009 | Jeon |
| 2009/0310934 | A1 | 12/2009 | Rodriguez |
| 2009/0313662 | A1 | 12/2009 | Rodriguez |
| 2009/0313668 | A1 | 12/2009 | Shepherd |
| 2009/0323822 | A1 | 12/2009 | Rodriguez |
| 2010/0003015 | A1 | 1/2010 | Rodriguez |
| 2010/0020870 | A1 | 1/2010 | Jeon |
| 2010/0026882 | A1 | 2/2010 | Jeon |
| 2010/0026883 | A1 | 2/2010 | Jeon |
| 2010/0026884 | A1 | 2/2010 | Jeon |
| 2010/0027417 | A1 | 2/2010 | Franceschini et al. |
| 2010/0027653 | A1 | 2/2010 | Jeon |
| 2010/0027654 | A1 | 2/2010 | Jeon |
| 2010/0027659 | A1 | 2/2010 | Jeon |
| 2010/0027660 | A1 | 2/2010 | Jeon |
| 2010/0027667 | A1 | 2/2010 | Samuelsson et al. |
| 2010/0027682 | A1 | 2/2010 | Jeon |
| 2010/0118973 | A1 | 5/2010 | Rodriguez et al. |
| 2010/0118974 | A1 | 5/2010 | Rodriguez et al. |
| 2010/0118978 | A1 | 5/2010 | Rodriguez et al. |
| 2010/0118979 | A1 | 5/2010 | Rodriguez et al. |
| 2010/0122311 | A1 | 5/2010 | Rodriguez et al. |
| 2010/0218232 | A1 | 8/2010 | Rodriguez |
| 2010/0241753 | A1 | 9/2010 | Garbajs et al. |
| 2010/0293571 | A1 | 11/2010 | Rodriguez |
| 2010/0322302 | A1 | 12/2010 | Rodriguez |
| 2011/0222837 | A1 | 9/2011 | Walton et al. |

FOREIGN PATENT DOCUMENTS

| | | |
|---|---|---|
| EP | 1 292 138 A2 | 3/2003 |
| EP | 1 328 119 A1 | 7/2003 |
| JP | 05-236465 A | 9/1993 |
| KR | 10-2004-0054708 | 6/2004 |
| WO | WO 00/00981 A2 | 1/2000 |
| WO | WO 00/62552 A2 | 10/2000 |
| WO | WO 01/43440 A | 6/2001 |
| WO | WO 01/63774 A | 8/2001 |
| WO | WO 2004/102571 A1 | 11/2004 |
| WO | WO 2005/106875 A1 | 11/2005 |
| WO | WO 2006/083824 A2 | 8/2006 |
| WO | WO 2006/101979 A | 9/2006 |
| WO | WO 2006/114761 A1 | 11/2006 |
| WO | WO 2008/063881 A2 | 5/2008 |
| WO | WO 2009/018360 A1 | 2/2009 |
| WO | WO 2009/052262 A2 | 4/2009 |

OTHER PUBLICATIONS

International Search Report and Written Opinion dated Apr. 15, 2010 cited in International Application No. PCT/US2010/024927.
European Examination dated May 4, 2010 in Application No. 07 844 937.8.
U.S. Final Office Action in U.S. Appl. No. 11/627,452 dated Mar. 4, 2011.
U.S. Non-Final Office Action in U.S. Appl. No. 11/831,916 dated Mar. 31, 2011.
U.S. Non-Final Office Action in U.S. Appl. No. 12/417,869 dated Apr. 4, 2011.
U.S. Appl. No. 12/779,035, filed May 12, 2010 entitled "Signalling Buffer Characteristics for Splicing Operations of Video Streams", Inventors: Rodriguez et al.
Stuhlmuller, Klaus, et al., "Analysis of Video Transmission over Lossy Channels"; IEEE Journal on Selected Areas in Communication, vol. 18, No. 6, Jun. 2000, pp. 1012-1032.
PCT Search Report cited in International Appln No. PCT/US2009/064180 mailed Jan. 8, 2010.
PCT Written Opinion cited in International Appln No. PCT/US2009/064180 mailed Jan. 8, 2010.
PCT Search Report cited in International Appln No. PCT/US2009/047521 mailed Dec. 22, 2009.
PCT Written Opinion cited in International Appln No. PCT/US2009/047521 mailed Dec. 22, 2009.
European Examination dated Sep. 16, 2010 in Application No. 08 796 875.6.
U.S. Non-Final Office Action in U.S. Appl. No. 11/627,452 dated Nov. 10, 2010.
U.S. Non-Final Office Action in U.S. Appl. No. 11/831,916 dated Aug. 4, 2010.
European Communication dated Aug. 9, 2011 in Application No. 08 838 787.3.
European Communication dated Dec. 14, 2011 in Application No. 09 751 294.1.
U.S. Non-Final Office Action in U.S. Appl. No. 12/417,864 dated Apr. 18, 2011.
U.S. Final Office Action mailed Jul. 5, 2011 in U.S. Appl. No. 12/417,864.
U.S. Non-Final Office Action mailed Aug. 5, 2011 in U.S. Appl. No. 11/831,906.
U.S. Final Office Action mailed Aug. 5, 2011 in U.S. Appl. No. 12/417,869.
U.S. Non-Final Office Action mailed Sep. 14, 2011 in U.S. Appl. No. 12/124,779.
U.S. Non-Final Office Action mailed Sep. 22, 2011 in U.S. Appl. No. 11/831,912.
U.S. Final Office Action mailed Sep. 28, 2011 in U.S. Appl. No. 11/831,916.
U.S. Non-Final Office Action mailed Nov. 10, 2011 in U.S. Appl. No. 12/483,925.
U.S. Non-Final Office Action mailed Nov. 23, 2011 in U.S. Appl. No. 12/141,015.
U.S. Non-Final Office Action mailed Nov. 29, 2011 in U.S. Appl. No. 12/492,117.
U.S. Non-Final Office Action mailed Nov. 23, 2011 in U.S. Appl. No. 12/141,017.
U.S. Non-Final Office Action mailed Dec. 21, 2012 in U.S. Appl. No. 12/333,296.
U.S. Non-Final Office Action mailed Dec. 22, 2011 in U.S. Appl. No. 12/617,043.
U.S. Non-Final Office Action mailed Dec. 27, 2011 in U.S. Appl. No. 12/417,869.
U.S. Non-Final Office Action mailed Dec. 27, 2011 in U.S. Appl. No. 12/252,632.
U.S. Non-Final Office Action mailed Jan. 4, 2012 in U.S. Appl. No. 12/617,062.
U.S. Non-Final Office Action mailed Jan. 10, 2012 in U.S. Appl. No. 12/333,301.
U.S. Appl. No. 12/417,864, filed Apr. 3, 2009, entitled "System and Method for Authorization of Segment Boundary Notifications."
U.S. Appl. No. 12/417,868, filed Apr. 3, 2009, entitled "Segment Boundary Notification to a Digital Media Receiver."
U.S. Appl. No. 12/713,153, filed Feb. 25, 2010 entitled "Signalling of Auxiliary Information that Assists Processing of Video According to Various Formats", Inventors: Rodriguez et al.
U.S. Appl. No. 12/722,117, filed Mar. 11, 2010 entitled "Management of Picture Referencing in Video Streams for Plural Playback Modes", Inventors: Walton et al.
U.S. Appl. No. 12/417,869, filed Apr. 3, 2009 entitled "System and Method for Processing Segment Boundary Notifications".
MacInnis et al., International Organisation for Standardization Organisation Internationale Normalisation ISO/IEC JTC1/SC29/WG11 Coding of Moving Pictures and Audio, "NAL for AVC Video with MPEG-2 Systems", Video Standards and Drafts, Mar. 2002, pp. 1-11.
ITU-T Telecommunication Standardization Sector of ITU, Infrastructure of Audiovisual Services—Coding of Moving Video, "Advanced Video Coding for Generic Audiovisual Services", International Telecommunication Union, H.264, May 2003, XP008095420, 282 pages.
Tian et al., "Sub-Sequence Video Coding for Improved Temporal Scalability", 4 pages, Aug. 2005.
Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.

Amon et al., "File Format for Scalable Video Coding", IEEE Transactions on Circuits and Systems for Video Technology, vol. 17 No. 9, Sep. 2007, pp. 1174-1185.

ITU: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605-I_PDF_E.pdf, XP007905991, pp. 1-76.

SMPTE Journal, "Splice Points for MPEG-2 Transport Streams", SMPTE Inc., vol. 107 No. Oct. 1998, XP-000793004, pp. 916-925.

Rodriguez et al., "SEI message to convey suitable splice points in the bitstream", JVT Meeting, Document JVT-Z040, Filename JVT-Z040.doc, XP-30007329, Jan. 2008, pp. 1-8.

Luo et al., "On HRD conformance for splice bitstreams", JVT Meeting, Document JVT-V055r1, Filename JVT-V055r1.doc, XP-30006863, Jan. 2007, pp. 1-11.

Hurst et al., "MPEG Splicing Turorial and Proposed SMPTE Standard", Proceedings of the SMPTE Technical Conference, Nov. 1997, pp. 105-117.

International Search Report dated Sep. 4, 2009 cited in International Application No. PCT/US2009/047237.

Written Opinion dated Sep. 4, 2009 cited in International Application No. PCT/US2009/047237.

International Search Report dated Sep. 4, 2009 cited in International Application No. PCT/US2009/044370.

Written Opinion dated Sep. 4, 2009 cited in International Application No. PCT/US2009/044370.

International Search Report and Written Opinion dated Oct. 30, 1998 cited in International Application No. PCT/US2008/071621.

International Search Report and Written Opinion dated Oct. 18, 2004 cited in International Application No. PCT/US2004/023279.

International Search Report and Written Opinion dated Apr. 15, 2009 cited in International Application No. PCT/US2008/080128.

International Search Report dated May 23, 2008 cited in International Application No. PCT/US2007/083867.

Written Opinion dated May 23, 2008 cited in International Application No. PCT/US2007/083867.

International Preliminary Report on Patentability and Written Opinion dated Feb. 2, 2010 cited in International Application No. PCT/US2008/071111.

Canadian Office Action dated Dec. 11, 2009 in Application No. 2,533,169.

U.S. Non-Final Office Action dated Dec. 28, 2007 in U.S. Appl. No. 10/623,683.

U.S. Final Office Action dated Jul. 25, 2008 in U.S. Appl. No. 10/623,683.

U.S. Non-Final Office Action dated Feb. 1, 2010 in U.S. Appl. No. 11/831,916.

* cited by examiner

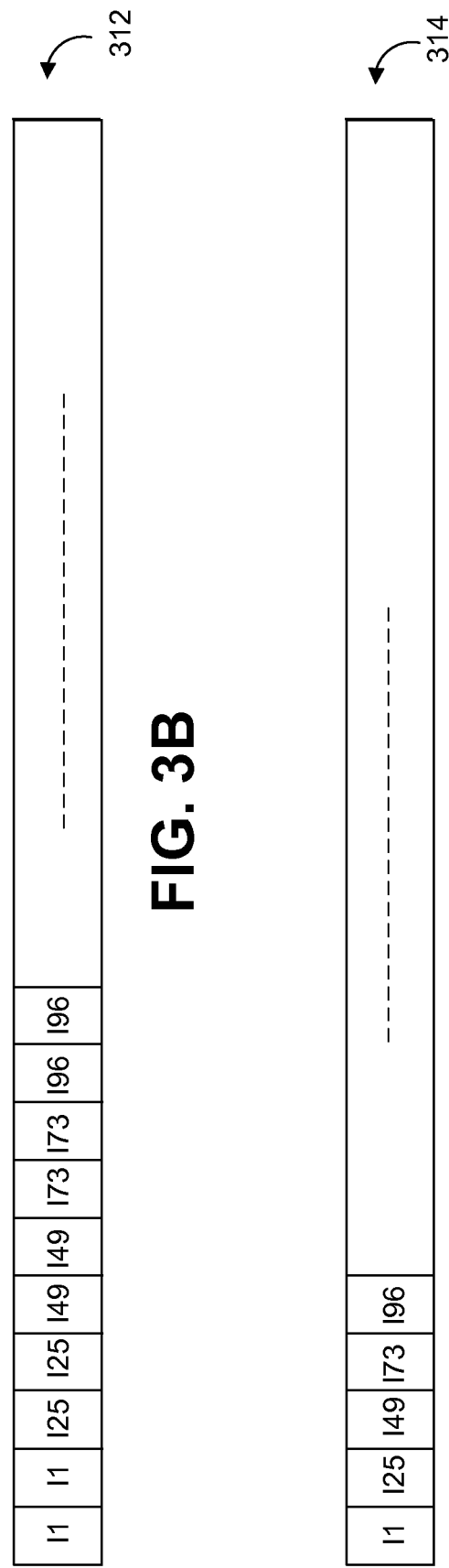

SIGNALLING OF DECODABLE SUB-SEQUENCES

CROSS REFERENCE TO RELATED APPLICATION

The present application claims priority to and the benefit of provisional patent application having Ser. No. 61/154,355, filed on Feb. 20, 2009, and incorporated herein by reference in its entirety.

TECHNICAL FIELD

This disclosure relates in general to processing of video streams.

BACKGROUND

In network systems such as subscriber television systems, a digital home communication terminal ("DHCT"), otherwise known as the set-top box, is capable of providing video services connected to the subscriber television system, and is typically located at the user's premises and connected to the subscriber television system, such as, for example, a cable or satellite network. The DHCT includes hardware and software necessary to provide digital video services to the end user with various levels of usability and/or functionality. One of the features of the DHCT includes the ability to receive and decode a digital video signal received as a compressed video signal. Another feature of the DHCT includes providing Personal Video Recorder (PVR) functionality through the use of a storage device coupled to the DHCT. When providing this PVR functionality or other stream manipulation functionality for formatted digital video streams of Advanced Video Coding (AVC), referred to herein as AVC streams, it becomes difficult to determine whether the video stream is suitable for a particular stream manipulation or PVR operation. This is because, for example, the AVC video coding standard generally has a rich set of compression tools and can exploit temporal redundancies among pictures in more elaborate and comprehensive ways than prior video coding standards.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A-3C are block diagrams that illustrates an example relationship between tiers, tier numbers, and certain trick modes in an embodiments of a PVRA system.

DESCRIPTION OF EXAMPLE EMBODIMENTS

Overview

Figure 1:
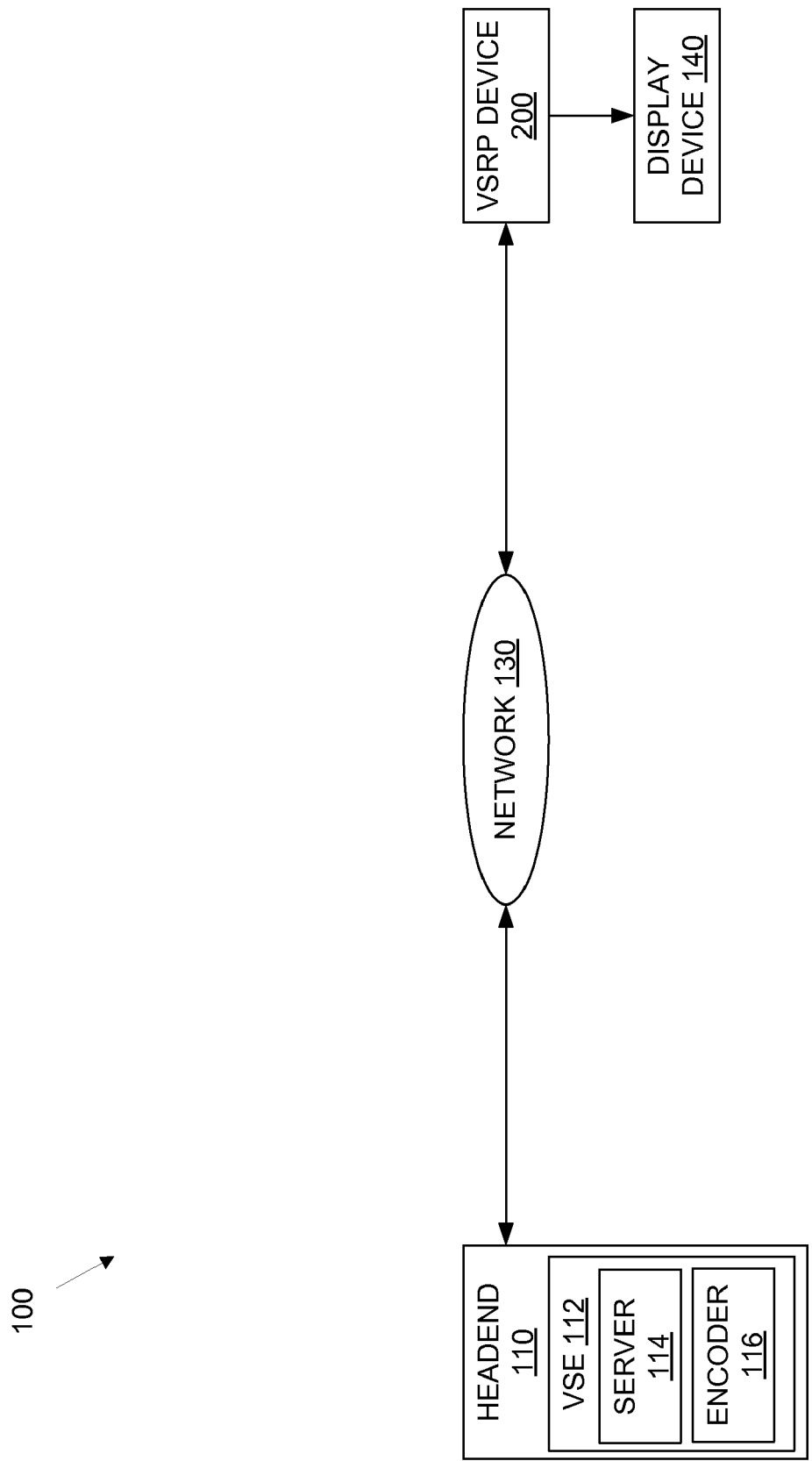
FIG. 1 is a block diagram that illustrates an example environment in which personal video recording assist (PVRA) systems and methods may be implemented.

In one method embodiment, receiving a transport stream corresponding to a video stream that comprises a sequence of pictures corresponding to a video program, each of the pictures of the sequence uniquely associated with one of k successive tiers, where k is a non-negative integer number starting with a lowest tier number; receiving personal video recording assist (PVRA) information in the transport stream, the PVRA information comprising an indication of a first tier number corresponding uniquely to the pictures associated with a first tier and a second tier number corresponding uniquely to the pictures associated with a second tier different than the first tier; responsive to a request for a first trick mode, decoding a first sub-sequence of pictures beginning at one of the pictures corresponding to a random access point (RAP) and consisting of the pictures of the sequence signaled by the PVRA information as the first tier number; and responsive to a request for a second trick mode that has a different playback speed than the first trick mode, decoding a second sub-sequence beginning at the one of the pictures corresponding to a RAP and consisting of all of the pictures of the sequence signaled as the first tier number, and one or more pictures of the sequence signaled by the PVRA information as the second tier number, the pictures corresponding to the first tier number decodable independently of the pictures corresponding to the second tier number.

In another method embodiment, providing a transport stream including a video stream that comprises a sequence of pictures corresponding to a video program, each of the pictures of the sequence uniquely associated with one of k successive tiers, where k is a non-negative integer number starting with a lowest tier number; and providing personal video recording assist (PVRA) information in the transport stream at a location corresponding to each of the pictures of the sequence associated with a first tier and each of the pictures of the sequence associated with a second tier different than the first tier, the PVRA information comprising an indication of a first tier number corresponding uniquely to the pictures associated with the first tier and a second tier number corresponding uniquely to the pictures associated with the second tier, the pictures corresponding to the first tier number decodable independently of the pictures corresponding to the second tier number.

EXAMPLE EMBODIMENTS

Disclosed herein are various example embodiments of Personal Video Recording Assist (PVRA) systems and methods (collectively, referred to herein also as a PVRA system or PVRA systems) that convey and/or process PVRA information delivered in, or associated with, a video stream. In one embodiment, a video stream emitter (e.g., network device such as a server, encoder, splicing device, etc.) located at a headend, hub, node, or other video (or multi-media) source location conveys the PVRA information in a transport stream that is transmitted to one or more video stream receive-and-process (VSRP) devices. In one embodiment, the PVRA information is included with each picture (for purposes of brevity, picture may be used herein interchangeably with frame or access unit) in a video stream, and signals to the VSRP device a tier number associated with the respective picture to facilitate PVR functionality in the manner as described below. The PVRA information identifies each of the pictures in a video stream as belonging to a given tier. Note that in some embodiments, it may not be necessary to signal the tier number for some pictures.

The tier framework describes decodable sub-sequences based on picture interdependencies, which allows or enables PVR logic in the VSRP device to efficiently select decodable pictures when performing a given trick mode. As indicated above, the PVRA information typically pertains to a respective associated picture or access unit.

A hierarchy of data dependency tiers contains "T" tiers. A tier having a larger tier number is a "higher" tier than a tier having a smaller tier number. The tiers are ordered hierarchically based on their "decodability" so that any picture in a tier does not depend directly or indirectly on any picture in a higher tier.

Stated differently, each picture in the video stream belongs to one of k tiers. In one embodiment, any picture in the $k^{th}$ tier must not depend directly or indirectly on the processing or decoding of any picture in the $(k+1)^{th}$ tier (e.g., next highest tier) or above. However, any picture in the $k^{th}$ tier may depend on other pictures belonging to the $k^{th}$ or a lower tier number that were transmitted earlier (e.g., prior pictures in the video stream).

Further discussion of tiers in the context of PVRA systems and example embodiments are described below. It should be understood that certain embodiments of the PVRA systems described herein disclose methods that are generic and/or applicable to all video codec specifications. In other words, the various methods contemplated to be within the scope of the PVRA systems do not impose a specific PVR paradigm implementation.

Certain embodiments of PVRA systems are described hereinafter in the context of an example subscriber television system environment, with the understanding that other multimedia (e.g., video, graphics, audio, and/or data) environments, including Internet Protocol Television (IPTV) network environments, cellular phone environments, and/or hybrids of these and/or other networks, may also benefit from certain embodiments of the PVRA systems and methods and hence are contemplated to be within the scope of the disclosure. It should be understood by one having ordinary skill in the art that, though specifics for one or more embodiments are disclosed herein, such specifics as described are not necessarily part of every embodiment.

FIG. 1 is a high-level block diagram depicting an example environment in which one or more embodiments of a PVRA system are implemented. In particular, FIG. 1 is a block diagram that depicts an example subscriber television system (STS) 100. In this example, the STS 100 includes a headend 110 and one or more video stream receive-and-process (VSRP) devices 200 (one shown). The VSRP device 200 and the headend 110 are coupled via a network 130. The headend 110 and the VSRP device 200 cooperate to provide a user with television services, including, for example, broadcast television programming, interactive program guide (IPG) services, video-on-demand (VOD), and pay-per-view, as well as other digital services such as PVR, music, Internet access, commerce (e.g., home-shopping), voice-over-IP (VOIP), and/or other telephone or data services.

The VSRP device 200 is typically situated at a user's residence or place of business and may be a stand-alone unit or integrated into another device such as, for example, the display device 140, a personal computer, personal digital assistant (PDA), mobile phone, among other devices. In other words, the VSRP device 200 (also may be referred to as a digital receiver, processing device, or digital home communications terminal (DHCT)) may comprise one of many devices or a combination of devices, such as a set-top box, television with communication capabilities, cellular phone, personal digital assistant (PDA), or other computer or computer-based device or system, such as a laptop, personal computer, DVD/CD recorder, among others. As set forth above, the VSRP device 200 may be coupled to the display device 140 (e.g., computer monitor, television set, etc.), or in some embodiments, may comprise an integrated display (with or without an integrated audio component).

The VSRP device 200 receives signals (video, audio and/or other data) including, for example, digital video signals in a compressed representation of a digitized video signal such as, for example, AVC streams modulated on a carrier signal, and/or analog information modulated on a carrier signal, among others, from the headend 110 through the network 130, and provides reverse information to the headend 110 through the network 130. The VSRP device 200 comprises, among other components, a coupled storage device (e.g., DVD recorder and/or player, CD recorder and/or player, etc.), as explained further below.

The television services are presented via a display device 140, which typically comprises a television set that, according to its type, is driven with an interlaced scan video signal or a progressive scan video signal. However, the display device 140 may also be any other device capable of displaying video images including, for example, a computer monitor, a mobile phone, game device, etc. In one implementation, the display device 140 is configured with an audio component (e.g., speakers), whereas in some implementations, audio functionality may be provided by a device that is separate yet communicatively coupled to the display device 140 and/or VSRP device 200. Although shown communicating with a display device 140, the VSRP device 200 may communicate with other devices that receive, store, and/or process video streams from the VSRP device 200, or that provide or transmit video streams or uncompressed video signals to the VSRP device 200.

The network 130 may comprise a single network, or a combination of networks (e.g., local and/or wide area networks). Further, the communications medium(s) of the network 130 may comprise a wired connection or wireless connection (e.g., satellite, terrestrial, wireless LAN, etc.), or a combination of both. In the case of wired implementations, the network 130 may comprise a hybrid-fiber coaxial (HFC) medium, coaxial, optical, twisted pair, etc. Other networks are contemplated to be within the scope of the disclosure, including networks that use packets incorporated with and/or compliant to MPEG-2 transport and/or other transport layers or protocols.

The headend 110 includes a video stream emitter (VSE) 112. The VSE 112 may include one or more server devices (server) 114 (one shown) for providing video, audio, and other types of media or data to client devices such as, for example, the VSRP device 200, and one or more encoders (encoding devices or compression engines) 116 (one shown). The VSE 112 provides a compressed video stream (e.g., in a transport stream) to the VSRP device 200 (or in some implementations, to an intermediary device). In one embodiment, the VSE 112 is configured to provide PVRA information in the transport layer encapsulating the video stream to signal to the VSRP device 200 the tier number for one or more pictures of a picture sequence. In some embodiments, the PVRA information may be provided in the transport stream in other locales (e.g., in a locale different than the locale in which the VSE 112 resides).

The headend 110 may receive content from sources external to the headend 110 or STS 100 via a wired and/or wireless connection (e.g., satellite or terrestrial network), such as from content providers, and in some embodiments, may receive package-selected national or regional content with local programming (e.g., including local advertising) for delivery to subscribers. One having ordinary skill in the art should understand that the headend 110 may comprise one or more additional servers (Internet Service Provider (ISP) facility servers, private servers, on-demand servers, channel change servers, multi-media messaging servers, program guide servers), splicers or splicing devices (e.g., for splicing in local feeds), modulators (e.g., QAM, QPSK, etc.), routers, bridges, gateways, multiplexers, transmitters, computers and/or controllers, and/or switches that process and deliver and/or forward (e.g., route) various digital services to subscribers.

The PVRA systems and methods disclosed herein are applicable to any video compression method performed according to a video compression specification allowing for at least one type of compressed picture that can depend on the corresponding decompressed version of each of more than one reference picture for its decompression and reconstruction. For example, the encoder 116 may compress an inputted video signal (e.g., provided by a service provider in one of any of several forms, image capture device, a headend server, etc.) according to the specification of the AVC standard and produce an AVC stream containing different types of compressed pictures, some that may have a first compressed portion that depends on a first reference picture for their decompression and reconstruction, and a second compressed portion of the same picture that depends on a second and different reference picture. Since the compressed video (and audio) streams are produced in accordance with the syntax and semantics of a designated video (and audio) coding method, such as, for example, AVC, the compressed video (and audio) streams can be interpreted by an AVC-compliant decoder for decompression and reconstruction at the time of reception, at a future time, or both.

In one embodiment, each AVC stream is packetized into transport packets according to the syntax and semantics of transport specification, such as, for example, MPEG-2 transport defined in MPEG-2 systems. Each transport packet contains a header with a unique packet identification code, or PID, associated with the respective AVC stream. In one implementation, encoded audio-video (A/V) content for a single program may be the only program carried in a transport stream (e.g., one or more packetized elementary stream (PES) packet streams sharing a common time base), and in other implementations, the encoded A/V content for multiple programs may be carried as multiplexed programs in an MPEG-2 transport stream, each program associated with its own respective time base.

In IPTV embodiments, the program or transport stream may be further encapsulated in Internet protocol (IP) packets, and delivered via multicast (e.g., according to protocols based on Internet Group Management Protocol (IGMP), among other protocols), or in other cases such as video-on-demand (VOD), via unicast (e.g., Real-time Streaming Protocol or RTSP, among other protocols). For instance, multicast may be used to provide multiple user programs destined for many different subscribers. Communication of IP packets between the headend 110 and the VSRP device 200 may be implemented according to one or more of a plurality of different protocols or communication mechanisms, such as User Datagram Protocol (UDP)/IP, Transmission Control Protocol (TCP)/IP, transport packets encapsulated directly within UDP or Real-time Transport Protocol (RTP) packets, among others.

The PVRA information may be conveyed in the adaptation field of a transport packet that is "associated" with the start of an access unit. Constraints may be imposed such as a requirement of one access unit (AU) start per PES packet, where each PES packet may contain exactly one AU. The first payload byte after the PES header may be required to be the start of the AU in one embodiment. Further, the 'data_alignment_indicator' in the PES header may be set to a value of '1'. The maximum time interval between successive random access points (RAP) pictures in a video stream may be required to be less than a specific time interval. In some embodiments, non-paired fields may not be allowed in the video stream (e.g., an AVC/H.264 bitstream). Further description of the use of the PVRA information in the context of decoding and PVR functionality is described below.

In one embodiment, the PVRA information may be conveyed in respective adaptation fields of the MPEG-2 transport stream. For instance, the PVRA information may be located in the adaptation header's private data field of MPEG-2 transport stream packets containing the PES header of access units. In one embodiment, these MPEG-2 transport packets may be identifiable accordingly as packets that have their 'payload_unit_start_indicator' flag set to a value of '1' and the adaptation control field set to a value of '11'.

The STS 100 may comprise an IPTV network, a cable television network, a satellite television network, or a combination of two or more of these networks or other networks. Further, network PVR and switched digital video are also considered within the scope of the disclosure. Although described in the context of video processing, it should be understood that certain embodiments of the PVRA systems described herein also include functionality for the processing of other media content such as compressed audio streams. The STS 100 comprises additional components and/or facilities not shown, as should be understood by one having ordinary skill in the art.

In one embodiment, the PVRA system comprises the headend 110 and the VSRP device 200. In some embodiments, the PVRA system comprises portions of each of these components, or in some embodiments, one of these components or a subset thereof. In some embodiments, one or more additional components described above yet not shown in FIG. 1 may be incorporated in a PVRA system, as should be understood by one having ordinary skill in the art in the context of the present disclosure.

Figure 2:
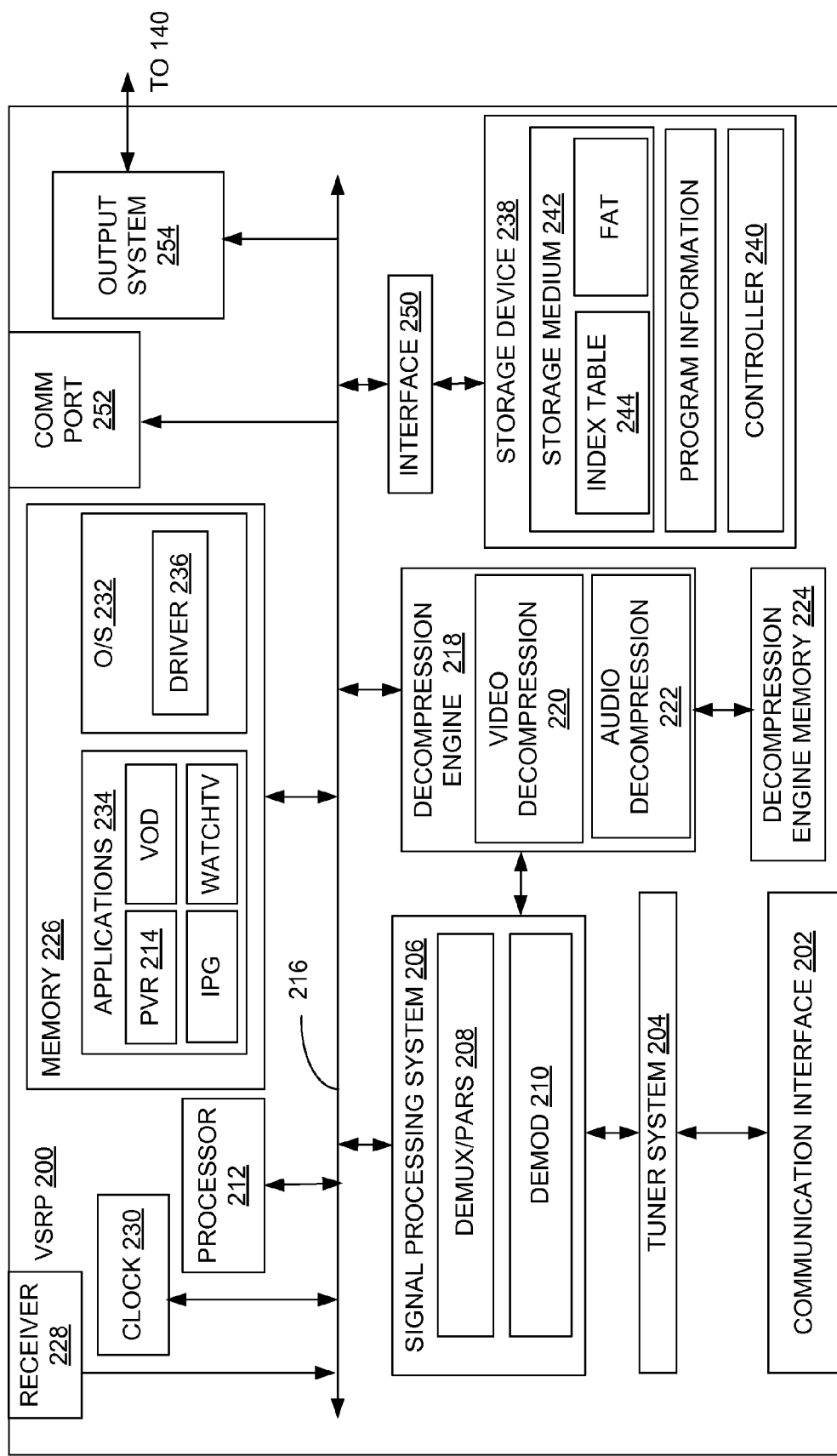
FIG. 2 is a block diagram of an example embodiment of a video stream receive-and-process (VSRP) device comprising an embodiment of a PVRA system.

FIG. 2 is an example embodiment of select components of a VSRP device 200. It should be understood by one having ordinary skill in the art that the VSRP device 200 shown in FIG. 2 is merely illustrative, and should not be construed as implying any limitations upon the scope of the disclosure. In one embodiment, a PVRA system may comprise all components shown in, or described in association with, the VSRP device 200 of FIG. 2. In some embodiments, a PVRA system may comprise fewer components, such as those limited to facilitating and implementing PVR functionality, the decoding of compressed video streams, and/or output processing of decompressed video streams. In some embodiments, functionality of the PVRA system may be distributed among the VSRP device 200 and one or more additional devices as mentioned above.

The VSRP device 200 includes a communication interface 202 (e.g., depending on the implementation, suitable for coupling to the Internet, a coaxial cable network, an HFC network, satellite network, terrestrial network, cellular network, etc.) coupled in one embodiment to a tuner system 204. The tuner system 204 includes one or more tuners for receiving downloaded (or transmitted) media content. The tuner system 204 can select from among a plurality of transmission signals provided by the STS 100 (FIG. 1). The tuner system 204 enables the VSRP device 200 to tune to downstream media and data transmissions, thereby allowing a user to receive digital media content via the STS 100. In one embodiment, analog TV signals can be received via the tuner system 204. The tuner system 204 includes, in one implementation, an out-of-band tuner for bi-directional data communication and one or more tuners (in-band) for receiving television signals. In some embodiments (e.g., IPTV-configured VSRP devices), the tuner system 204 may be omitted.

The tuner system 204 is coupled to a signal processing system 206 that in one embodiment comprises a transport demultiplexing/parsing system 208 (demux/pars, or hereinafter, demux) and a demodulating system 210 for processing broadcast and/or on-demand media content and/or data. One or more of the components of the signal processing system 206 may be implemented with software, a combination of software and hardware, or in hardware. The demodulating system 210 comprises functionality for demodulating analog or digital transmission signals.

The components of the signal processing system 206 are generally capable of QAM demodulation (though in some embodiments, other modulation formats may be processed such as QPSK, etc.), forward error correction, demultiplexing of MPEG-2 transport streams, and parsing of packets and streams. The signal processing system 206 has capabilities, such as filters, to detect bit patterns corresponding to fields in the transport packet's header information, adaptation field, and/or payload. Stream parsing may include parsing of packetized elementary streams or elementary streams. Packet parsing may include parsing and processing of data fields, such as the data fields in the adaptation fields in the transport packets that deliver PVRA information corresponding to each or substantially each of the compressed pictures in an AVC stream. In one embodiment, the parsing is performed by the signal processing system 206 (e.g., demux 208) extracting the information and one or more processors 212 (one shown) processing and interpreting the PVRA information, including the tier number of its associated picture. In some embodiments, the processor 212 performs the parsing, processing, and interpretation. The signal processing system 206 further communicates with the processor 212 via interrupt and messaging capabilities of the VSRP device 200.

Concurrently, the signal processing system 206 precludes further processing of packets in the multiplexed transport stream that are irrelevant or not desired, such as packets of data corresponding to other video streams. As indicated above, parsing capabilities of the signal processing system 206 allow for the ingesting by the VSRP device 200 of program associated information carried in the transport packets. The demux 208 is configured to identify and extract information in the transport stream to facilitate the identification, extraction, and processing of the compressed pictures. Such information includes Program Specific Information (PSI) (e.g., Program Map Table (PMT), Program Association Table (PAT), etc.) and parameters or syntactic elements (e.g., Program Clock Reference (PCR), time stamp information, payload_unit_start_indicator, etc.) of the transport stream (including packetized elementary stream (PES) packet information). Information extracted by the demux 208 includes PVRA information that assists PVR logic embodied in one embodiment as PVR application 214, as explained further below. Note that in some embodiments, the PVR application 214 may opt to disregard or modify the PVRA information. In some embodiments, PVRA information may not be transmitted for defined periods of time of a program, or for portions of a video stream, such as portions corresponding to a commercial.

In one embodiment, the demux 208 is configured with programmable hardware (e.g., PES packet filters). In some embodiments, the signal processing system 206 or one or more components thereof is configured in software, hardware, or a combination of hardware and software.

The signal processing system 206 is coupled to one or more busses (a single bus 216 is shown) and to decoding logic configured in one embodiment as a decompression engine 218 (or media engine). In some embodiments, reference to decoding logic may include one or more additional components, such as memory, processor 212, etc. The decompression engine 218 comprises a video decompression engine 220 (or video decoder or video decompression logic) and audio decompression engine 222 (or audio decoder or audio decompression logic). The decompression engine 218 is further coupled to decompression engine memory 224 (or media memory or memory), the latter which, in one embodiment, comprises one or more respective buffers for temporarily storing compressed (compressed picture buffer or bit buffer, not shown) and/or reconstructed pictures (decoded picture buffer or DPB). In some embodiments, one or more of the buffers of the decompression engine memory 224 may reside in whole or in part in other or additional memory (e.g., memory 226) or components.

The VSRP device 200 further comprises additional components coupled to the bus 216. For instance, the VSRP device 200 further comprises a receiver 228 (e.g., infrared (IR), radio frequency (RF), etc.) configured to receive user input (e.g., via direct-physical or wireless connection via a keyboard, remote control, voice activation, etc.) to convey a user's request or command (e.g., for program selection, stream manipulation such as fast forward, rewind, pause, channel change, etc.), the processor 212 (indicated above) for controlling operations of the VSRP device 200, and a clock circuit 230 comprising phase and/or frequency locked-loop circuitry to lock into a system time clock (STC) from a program clock reference, or PCR, received in the video stream to facilitate decoding and output operations.

For instance, time stamp information (e.g., presentation time stamp/decode time stamp, or PTS/DTS) in the received video stream is compared to the reconstructed system time clock (STC) (generated by the clock circuit 230) to enable a determination of when the buffered compressed pictures are provided to the video decompression engine 220 for decoding (DTS) and when the buffered, decoded pictures are output by the video decompression engine 220 according to their PTS via the output system 254. The output system 254 hence may comprise graphics and display pipelines and output logic including HDMI, DENC, or other known systems. In some embodiments, clock circuit 230 may comprise plural (e.g., independent or dependent) circuits for respective video and audio decoding operations and output processing operations. Although described in the context of hardware circuitry, some embodiments of the clock circuit 230 may be configured as software (e.g., virtual clocks) or a combination of hardware and software.

The VSRP device 200 further comprises memory 226, which comprises volatile and/or non-volatile memory, and is configured to store executable instructions or code associated with an operating system (O/S) 232, one or more other applications 234 (e.g., the PVR application 214, interactive programming guide (IPG), video-on-demand (VOD), WatchTV (associated with broadcast network TV), among other applications not shown such as pay-per-view, music, etc.), and driver software 236.

The VSRP device 200 further comprises one or more storage devices (one shown, storage device 238). The storage device 238 may be located internal to the VSRP device 200 and coupled to the bus 216 through a communication interface 250. The communication interface 250 may include an integrated drive electronics (IDE), small computer system interface (SCSI), IEEE-1394 or universal serial bus (USB), among others. In one embodiment, the storage device 238 comprises associated control logic, such as a controller 240, that in coordination with one or more associated drivers 236 effects the temporary storage of buffered media content and/or more permanent storage of recorded media content. Herein, references to write and/or read operations to the storage device 238 is understood to refer to write and/or read operations to/from one or more storage mediums of the storage device 238. The device driver 236 is generally a software module interfaced with and/or residing in the operating system 232. The device driver 236, under management of the operating system 232, communicates with the storage device controller 240 to provide the operating instructions for the storage device 238. As conventional device drivers and device controllers are well known to those of ordinary skill in the art, further discussion of the detailed working of each will not be described further here. The storage device 238 may further comprise one or more storage mediums 242 such as hard disk, optical disk, or other types of mediums, and an index table 244, among other components (e.g., FAT, program information, etc.) as should be understood by one having ordinary skill in the art.

In one implementation, video streams are received in the VSRP device 200 via communications interface 202 and stored in a temporary memory cache (not shown). The temporary memory cache may be a designated section of memory 226 or an independent memory attached directly, or as part of a component in the VSRP device 200. The temporary cache is implemented and managed to enable media content transfers to the storage device 238 (e.g., the processor 212 causes the transport stream in memory 226 to be transferred to a storage device 238). In some implementations, the fast access time and high data transfer rate characteristics of the storage device 238 enable media content to be read from the temporary cache and written to the storage device 238 in a sufficiently fast manner. Multiple simultaneous data transfer operations may be implemented so that while data is being transferred from the temporary cache to the storage device 238, additional data may be received and stored in the temporary cache.

Alternatively or additionally, the storage device 238 may be externally connected to the VSRP device 200 via a communication port, such as communication port 252. The communication port 252 may be configured according to IEEE-1394, USB, SCSI, or IDE, among others. The communications port 252 (or ports) may be configured for other purposes, such as for receiving information from and/or transmitting information to devices other than an externally-coupled storage device.

With regard to processing of PVRA information, the processor 212 interprets PVRA information received in the transport stream and produces annotations associated with the respective tier number corresponding to a video program to fulfill or enhance PVR functionality provided to an end user, such as trick modes. For instance, the signal processing system 206 parses (e.g., reads and interprets) transport packets, and deposits the information corresponding to the PVRA information for each picture in memory 226. Note that the signal processing system 206 can parse the received transport stream (or program stream in some embodiments) without disturbing its video stream content and deposit the parsed transport stream (or program stream) into memory 226. The processor 212 may generate the annotations even if the video program is encrypted because the PVRA information is carried unencrypted since the adaptation field of transport packets is unencrypted. Note that additional relevant security, authorization and/or encryption information may be stored.

As the AVC stream is received and stored in storage device 238, the processor 212 annotates the location of pictures within the AVC stream as well as other pertinent information (e.g., PVRA information) corresponding to each picture when present. Alternatively or additionally, the annotations may be according to or derived, at least in part, from the PVRA information. For instance, the processor 212 receives the PVRA information parsed from the transport stream, and then determines based on the PVRA information to which tier the corresponding picture belongs. The processor 212 may annotate the received pictures with the associated tier number for later use in decode operations. For instance, the processor 212 may generate ancillary data in the form of a table or data structure (e.g., index table 244) comprising the relative or absolute location of the beginning of certain pictures in the compressed video stream and also makes annotations for PVR operations. The annotations produced by the processor 212 may be stored in storage device 238 to enable normal playback as well as other playback modes of the stored instance of the AVC stream.

In one embodiment, as indicated above, the processor 212 annotates the location of pictures within the video stream or transport stream as well as other pertinent information corresponding to the video stream based in one embodiment on the reception and interpretation of PVRA information. Thus, the pictures may be sorted-out based on tiers. The annotations by the processor 212 enable normal playback as well as other playback modes of the stored instance of the video program. Other playback modes, often referred to as "trick modes," may comprise backward or reverse playback, forward playback, or pause or still. Each of the different playback modes may require the decoding of a given sub-sequence of pictures uniquely pertaining to pictures of a given tier (tier number) or a combination of different tiers, depending on the desired (e.g., user-invoked or machine-invoked) stream manipulation.

The playback modes may comprise one or more playback speeds other than the normal playback speed. A trick mode may be characterized by: (1) its speed as a multiplicative factor in relation to the speed of the normal playback mode, and (2) its direction, either forward or reverse. Some playback speeds may be slower than normal speed and others may be faster. Faster playback speeds may constitute speeds considered very fast (e.g., greater than three times normal playback speed), as determined by a threshold, and critical faster speeds (e.g., greater than normal playback speed but not above the threshold). This threshold can be referred to as the critical fast-speed threshold. In one embodiment, the critical fast-speed threshold is further influenced by the picture rate implemented by the output system 254 to output the video signal corresponding to decompressed version of the pictures of the AVC stream to the display device 140. In some embodiments, the basis is further determined on whether the output system 254 is providing a progressive or interlaced video signal to the display device 140. Then, for a given stream manipulation, such as fast forward, the knowledge of these different tiers (e.g., as annotated in a storage device) can be used, for instance, to drop pictures and still be assured that all picture references are satisfied.

Figure 3A:
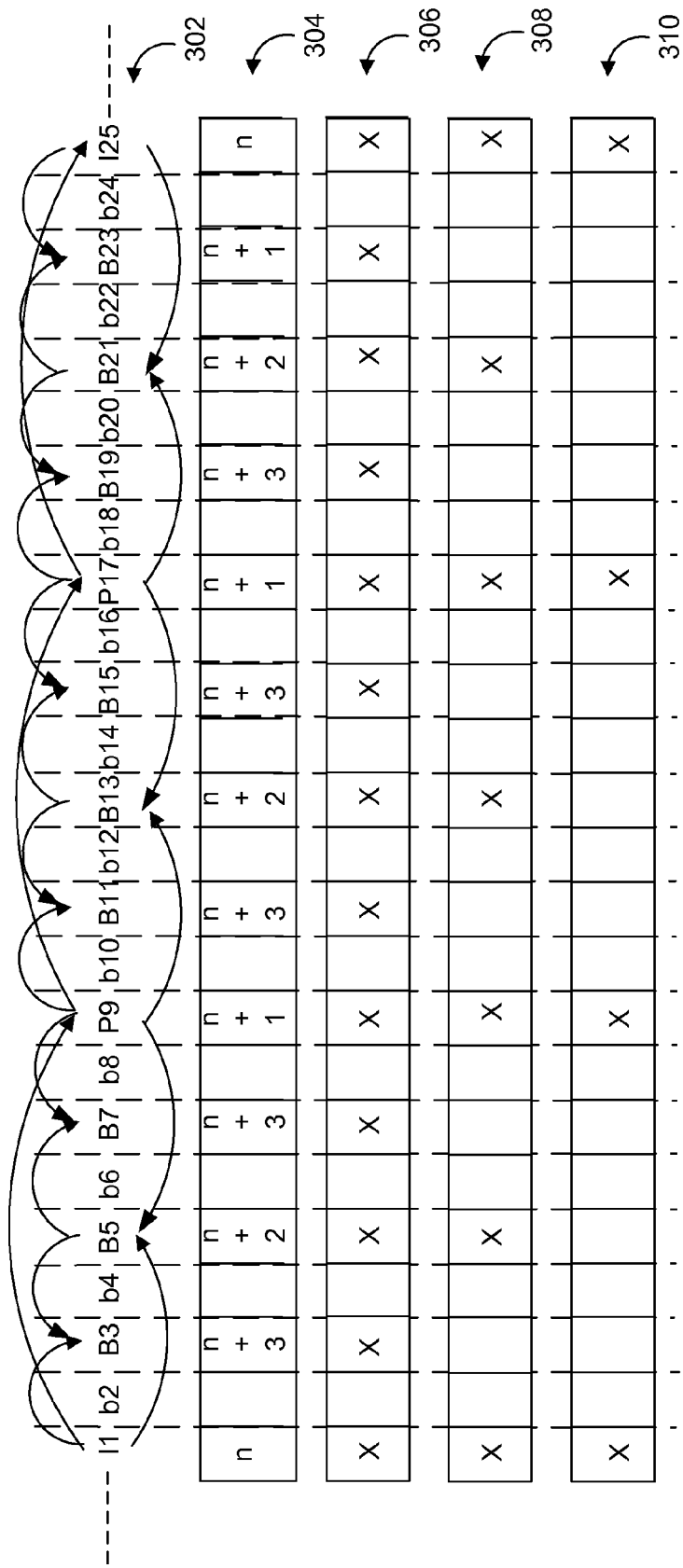

FIG. 3A is a block diagram that illustrates an example relationship between picture interdependencies and tiers (and corresponding tier numbers), and some example decodable sub-sequences corresponding to implementation of certain example trick modes. It should be understood that AVC/H.264 picture types and interdependencies are contemplated to be within the scope of the PVRA embodiments, as well as other codec standards and/or specifications. The first row 302 comprises one picture interdependency scheme, with letters I, P, and B corresponding to respective picture types (e.g., "I" corresponding to an Intra-coded picture or an Instantaneous Decode Refresh (IDR) picture, etc.), and the arrowhead lines pertaining to the picture interdependencies (e.g., I1 predicts B3 and P9, B5 predicts B3 and B7, etc.). Picture interdependencies involving some picture types (e.g., b2, b4, such as where B3 predicts b2, etc.) are omitted from this diagram (as are the corresponding tier numbers and trick modes) to avoid unduly complicating the diagram. The dashed lines on each side of row 302 are intended to convey that the sequence of pictures shown in FIG. 3A may be a continuum of a larger video stream (or larger sequence). Accordingly, it should be understood that the sequence shown in FIG. 3A is for illustrative purposes, and not intended to be limiting. Row 304 shows the tier numbers corresponding to four (4) tiers, starting from a lowest tier number "n," to a next higher tier number "n+1," and then to a next higher tier number, "n+3." As shown collectively from rows 302 and 304, the I pictures of the picture sequence shown in row 302 are signaled as tier n pictures, the "P" pictures are signaled as tier n+1 pictures, the "B" pictures predicted exclusively from the "P" and "I" pictures are signaled as tier n+2 pictures, and the other "B" pictures are signaled as tier n+3 pictures.

Row 306 corresponds to an example independently decodable sub-sequence of pictures in tier n through tier n+3 (e.g., includes pictures stored in the storage device 238 and each annotated as either tier n, tier n+1, tier n+2, or tier n+3 based on signaling from the headend 110) based on a request for a 2× playback speed corresponding to one trick mode, whereby the request causes the retrieval and subsequent decoding and output of the corresponding tier pictures.

Row 308 corresponds to an example independently decodable sub-sequence of pictures in tier n through tier n+2 (e.g., includes pictures stored in the storage device 238 and each annotated as either tier n, tier n+1, or tier n+2 based on signaling from the headend 110) based on a request for a 4× playback speed corresponding to another trick mode, whereby the request causes the retrieval and subsequent decoding and output of the corresponding tier pictures.

Row 310 corresponds to an example independently decodable sub-sequence of pictures in tier n through tier n+1 (e.g., includes pictures stored in the storage device 238 and each annotated as either tier n or tier n+1 based on signaling from the headend 110) based on a request for a 8× playback speed corresponding to another trick mode, whereby the request causes the retrieval and subsequent decoding and output of the corresponding tier pictures.

FIGS. 3B and 3C show some example decodable sub-sequences that consist entirely of I pictures to enable in some embodiments even higher playback speeds (for a desired trick mode) than those illustrated in FIG. 3A. For instance, row 312 shows one implementation whereby I pictures across many GOPs (or other segments or patterns) may be repeated (e.g., once per I picture in this example) to achieve a trick mode corresponding to a 12× playback as shown in FIG. 3B. FIG. 3C illustrates the selection of each I picture that begins and ends a given GOP (e.g., segment or pattern) across plural GOPs to achieve a trick mode corresponding to a 24× playback speed, as shown in row 314. Variations to these implementations are contemplated to be within the scope of the PVRA embodiments.

Referring again to FIG. 2, in one embodiment, the PVRA information of each compressed picture in the AVC stream is provided to the decompression engine 218 by the processor 212 as the AVC stream is received and processed in VSRP device 200. In some embodiments, the PVRA information (e.g., associated with the annotations) stored in the storage device 238 is provided to the decompression engine 218 by the processor 212 during playback of a trick mode. In some embodiments, the PVRA information for each compressed picture (or sets of compressed pictures in some embodiments), as well as relevant annotation information that may be necessary, are only provided to the decompression engine 218 during a trick mode, wherein the processor 212 has programmed the decompression engine 218 to perform trick modes.

Consider an embodiment where one of plural tier values is available to assign to a picture. The tiers are numbered with successive nonnegative integers. For instance, the lowest tier number corresponds to the first level of picture extractability, and each subsequent tier corresponds to the next level of picture extractability in the video stream. The highest tier number corresponds to the last level of picture extractability. In AVC streams, all pictures associated with the highest tier number shall have 'nal_ref_idc' equal to '0'. It should be noted that some pictures with 'nal_ref_idc' equal to '0' may not be signaled as the highest tier number. In some embodiments, some PVRA information may not signal pictures belonging to the highest tier number.

The following describes aspects of sub-sequence decidability and guarantees full picture reconstruction of a desired location in the video stream corresponding to a picture where it is desired as the point of entry. Assume that the lowest tier number is "n" and the highest tier number is "m." For instance, in one embodiment, a tier numbering scheme may associate the lowest tier number to a value of n equal to zero (0). In some embodiments, the lowest tier number may be one (1). Other schemes for numbering are contemplated. Starting from a RAP picture and including the RAP picture, the lowest tier n number (Tier n) pictures can be decoded and output independently of higher tier number pictures in the video stream. In one embodiment, all RAP pictures belong to the lowest tier number (Tier n). Starting from a RAP, the next highest tier number (e.g., the tier number equal to the lowest tier number plus one, or n+1) after the lowest tier number pictures are pictures that can be decoded progressively and output independently of pictures in the next highest tier number after n+1) through the highest tier number (e.g., Tier m). For example, and using a value of zero (0) for Tier n and a value of seven (7) for Tier m (with the understanding that other values may be used in some embodiments), for any value of k=0, 1, . . . 7, a Tier k picture is decodable if all immediately-preceding Tier 0 through Tier k pictures, inclusive, in the video stream have been decoded.

In one embodiment, if the tier number, Tier n, is signaled for a RAP picture, the tier number is signaled for all of the respective Tier n pictures prior to the next RAP. To ensure the full reconstruction of all the pictures after the rth RAP, a decodability entry point (DEP) of a decodable sub-sequence is defined to be at the rth RAP if the rth RAP contains an IDR picture, otherwise, the DEP is at the (r−1)th RAP (e.g., the RAP immediately preceding the rth RAP). Assuming that the lowest tier number (n) pictures are intra-coded pictures, those pictures do not depend on other pictures for referencing.

Assuming for sake of simplicity in explanation the tier number values of zero (0) through seven (7) for tier number pictures ranging from the lowest to the highest tier number, for pictures in tier numbers above the lowest tier number, in one embodiment, a Tier k picture after a RAP in a decodable sub-sequence is decodable only if: (1) its tier number is signaled; and (2) for each and every picture belonging to Tiers 1 thru k that are located between the Tier k pictures DEP and the Tier k picture, the corresponding tier number is signaled. For all values of k, the lowest tier number (e.g., Tier 0 in this example)<=k<=7, if the tier number is signaled for a decodable Tier k picture located between the rth and (r+1)th RAPs of a decodable sub-sequence, then the respective tier number shall be signaled for all Tiers 0 through Tier k pictures that are located between the Tier k picture's DEP and the (r+1)th RAP.

In one embodiment, again assuming tier 0 through tier 7 as a non-limiting example, for the interval demarcated by a Tier k pictures DEP and the Tier k picture, where the tier number is signaled for the Tier k picture, the Tier k picture shall not belong to a decodable sub-sequence unless the tier number is signaled for: (1) all the RAP pictures present in the interval; and (2) at least one picture corresponding to each of the respective tiers from Tier 0 through Tier k−1. This ensures that there are no gaps in tier numbering, and especially in an embodiment when discardable pictures are allowed only to be Tier 7 or Tier 6 pictures. A signaled Tier k picture is considered a discardable picture if it does not belong to a decodable sub-sequence. If there is discontinuity in tier number (e.g., gap) in the aforementioned demarcated interval, such as when no picture is signaled with at least one tier number between Tier 0 and Tier k−1, if the tier number of a picture is not signaled, the picture shall be considered a discardable picture and not belong to a decodable sub-sequence.

Note that in one embodiment, Tier 7 pictures can be discarded without affecting the decodability of all other pictures in the video stream. In some embodiments, Tier 6 pictures can be discarded if and only if all Tier 6 and Tier 7 pictures are discarded between the DEP and the next RAP that contains an IDR picture. More generally, for any value of k=1, . . . 6, a Tier k picture can be discarded if and only if all Tier k through Tier 7 pictures are discarded between the DEP and the next RAP that contains an IDR picture.

It is further noted that there are some assumptions or in some embodiments, constraints ascribed to one or more of the above-described embodiments. For instance, a picture that depends on a reference picture cannot have a tier number smaller than the tier number of the reference picture.

Further, a picture that depends on a picture issuing an MMCO (as specified in the AVC/H.264 standard) that affects its picture referencing cannot have a tier number smaller than the tier number of the picture issuing the MMCO. In some cases, a picture issuing an MMCO affecting the order of reference pictures may not need to be decoded but its slice layer processed.

In addition, two field pictures belonging to the same frame may be required to have the same tier number. Starting at a RAP, the two field pictures belonging to the same frame may be found by checking the value of 'pvr_assist_pic_struct' in consecutive pictures.

In one example embodiment, the PVRA information may signal to the processor 212 (and/or decoding logic) at least one picture in the corresponding AVC stream that has a tier number corresponding to a discardable picture, such as a Tier m picture. For instance, the decompression engine 218 does not decompress pictures signaled in the PVRA information as Tier m pictures during the fulfillment of a first trick mode. Such pictures may be referred to as skipped pictures during the fulfillment of a trick mode. A picture in the AVC stream that is not signaled as a Tier m picture may be decompressed by decompression engine 218 and displayed via output system 254 during the fulfillment of the first trick mode (based on signaling of a respective tier number lower than Tier m for each of those pictures and a strategy of the PVR application 214 to process, for trick mode implementation, pictures corresponding to Tiers n to m−1). Pictures signaled as Tier m pictures may be decompressed and displayed during a second trick mode of a different playback speed than the first trick mode.

In some embodiments, the processor 212 performs interpretation of the PVRA information corresponding to the AVC stream as explained above and causes decompression engine 218 to forgo decompression of pictures signaled as Tier m pictures by prohibiting their delivery to decompression engine 218. Furthermore, the processor 212 may cause pictures signaled as Tier m pictures to not be retrieved from storage device 238.

In some embodiments, processor 212 interprets the PVRA information that signals pictures in the corresponding AVC stream that possess a given tier number, such as a discardable picture (Tier m), and associates such pictures as potential skipped pictures for the trick modes in a first set of trick modes. Each trick mode in the first set is different from each other. The processor 212 determines the trick modes in the first set of trick modes according to their direction and speed in relation to the critical fast-speed threshold. For a common portion of an AVC stream, the processor 212 has the capability to determine for each respective trick mode in the first set of trick modes a corresponding set of pictures to skip among the identified pictures. The set and/or number of skipped pictures (e.g., not decompressed) when fulfilling two different trick modes may be different.

Depending on the speed and direction of the trick mode, a skipped picture may result in a corresponding pair of behaviors: (1) a decompression behavior, and (2) an output behavior. For example, while fulfilling a first trick mode, a skipped picture results in decompression engine 218 decompressing and outputting an alternate picture in the AVC stream. However, during a second trick mode different than the first trick mode, the same picture in the AVC stream is skipped but the decompression engine 218 does not perform decompression of an alternate picture in the AVC stream and the previously decompressed and output picture is output repeatedly at least once. In a third trick mode, the same picture in the AVC stream is skipped and the corresponding pair of behaviors are (1) the decompression engine 218 decompresses an alternate picture in the AVC stream, and (2) the previously decompressed and output picture is output repeatedly at least once.

In some embodiments, the PVRA information may be processed by other network components (not shown) in the subscriber television system 100. For instance, such network components may have the capability to process and interpret transport packets for the purpose of performing or fulfilling a certain functionality required for a video service or an application. Such network components may perform a particular stream manipulation operation based on the PVRA information, if any, corresponding to the respective compressed pictures, preferably doing so without parsing or decompressing the AVC stream or with a reduced amount of parsing, interpretation, and/or decompression of the AVC stream.

One having ordinary skill in the art should understand that the VSRP device 200 may include other components not shown, including compression engine, decryptors, samplers, digitizers (e.g., analog-to-digital converters), multiplexers, conditional access processor and/or application software, Internet browser, among others. In some embodiments, functionality for one or more of the components illustrated in, or described in association with, FIG. 2 may be combined with another component into a single integrated component or device or distributed among several components or devices.

The PVRA system may comprise the entirety of the VSRP device 200 in one embodiment, the VSE 112 in some embodiments, or a combination of both components in certain embodiments. In some embodiments, the PVRA system may comprise or one or more components thereof, or additional components not shown. The PVRA system may be implemented in hardware, software, firmware, or a combination thereof. To the extent certain embodiments of the PVRA system or a portion thereof are implemented in software or firmware, executable instructions for performing one or more tasks of the PVRA system are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the PVRA system or portions thereof are implemented in hardware, the PVRA system may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Figure 4:
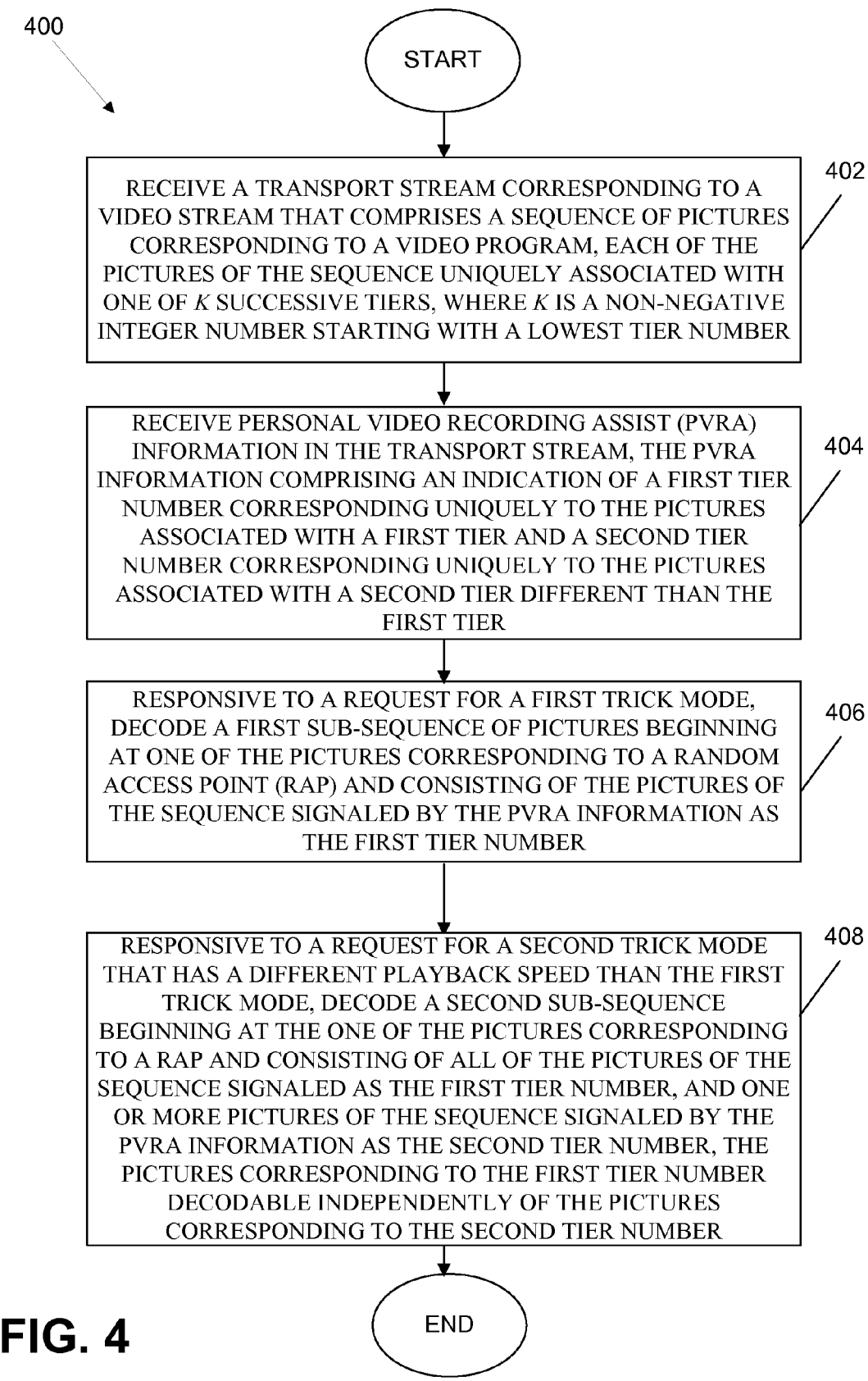
FIG. 4 is a flow diagram that illustrates one example PVRA method embodiment to process video based on receipt and interpretation by a VSRP device of PVRA information.
Figure 5:
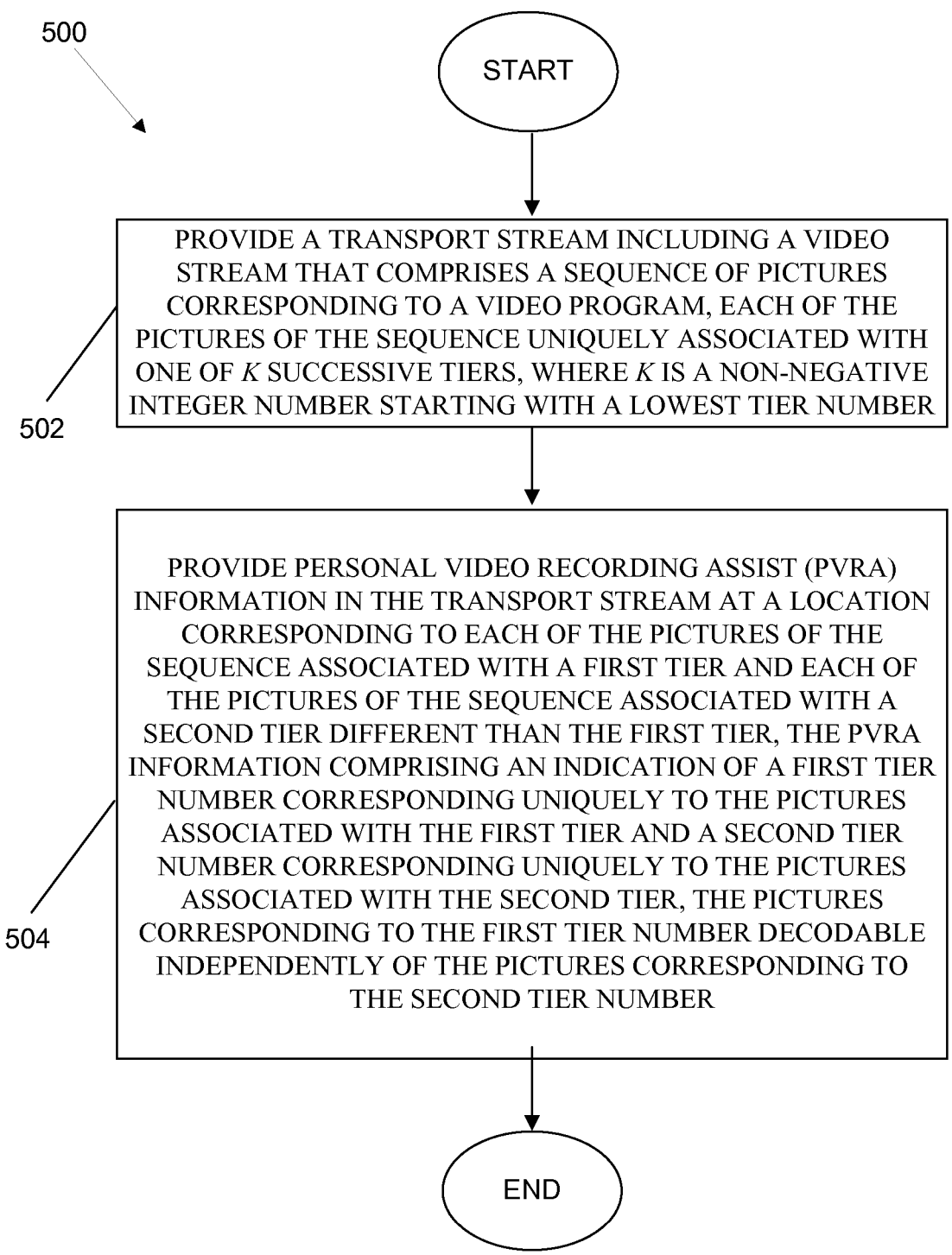
FIG. 5 is a flow diagram that illustrates one example PVRA method embodiment to deliver PVRA information to a VSRP device.

Having described certain embodiments of PVRA systems and methods, attention is directed to FIGS. 4 and 5 to further describe the mechanisms used by certain embodiments of PVRA systems to facilitate processing (e.g., decoding operations) of pictures (e.g., for PVR functionality). Referring to the example method embodiment 400 of FIG. 4, as implemented for instance by a VSRP device 200, one example method comprises receiving a transport stream corresponding to a video stream that comprises a sequence of pictures corresponding to a video program, each of the pictures of the sequence uniquely associated with one of k successive tiers, where k is a non-negative integer number starting with a lowest tier number (402); receiving personal video recording assist (PVRA) information in the transport stream, the PVRA information comprising an indication of a first tier number corresponding uniquely to the pictures associated with a first tier and a second tier number corresponding uniquely to the pictures associated with a second tier different than the first tier (404); responsive to a request for a first trick mode, decoding a first sub-sequence of pictures beginning at one of the pictures corresponding to a random access point (RAP) and consisting of the pictures of the sequence signaled by the PVRA information as the first tier number (406); and responsive to a request for a second trick mode that has a different playback speed than the first trick mode, decoding a second sub-sequence beginning at the one of the pictures corresponding to a RAP and consisting of all of the pictures of the sequence signaled as the first tier number, and one or more pictures of the sequence signaled by the PVRA information as the second tier number, the pictures corresponding to the first tier number decodable independently of the pictures corresponding to the second tier number (408).

It should be appreciated that another example method embodiment 500 implemented at a VSE 112, shown in, and described in association with, FIG. 5, comprises providing a transport stream including a video stream that comprises a sequence of pictures corresponding to a video program, each of the pictures of the sequence uniquely associated with one of k successive tiers, where k is a non-negative integer number starting with a lowest tier number (502); and providing personal video recording assist (PVRA) information in the transport stream at a location corresponding to each of the pictures of the sequence associated with a first tier and each of the pictures of the sequence associated with a second tier different than the first tier, the PVRA information comprising an indication of a first tier number corresponding uniquely to the pictures associated with the first tier and a second tier number corresponding uniquely to the pictures associated with the second tier, the pictures corresponding to the first tier number decodable independently of the pictures corresponding to the second tier number (504).

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 4-5 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to one or more of the methods described in FIGS. 4-5, either in the beginning, end, and/or as intervening steps, and that in some embodiments, fewer steps may be implemented. Further, note that references to storage device may also include in some embodiments non-volatile memory and/or permanent storage.

It should be emphasized that the above-described embodiments of the disclosure are merely possible examples, among others, of the implementations, setting forth a clear understanding of the principles of the PVRA systems and methods. Many variations and modifications may be made to the above-described embodiments without departing substantially from the principles set forth herein. Although all such modifications and variations are intended to be included herein within the scope of this disclosure and protected by the following claims, the following claims are not necessarily limited to the particular embodiments set out in the description.

What is claimed is:

1. A method, comprising:

receiving a transport stream corresponding to a video stream that comprises a sequence of pictures corresponding to a video program, each of the pictures of the sequence uniquely associated with one of k successive tiers, where k is a non-negative integer number starting with a lowest tier number;

receiving personal video recording assist (PVRA) information in the transport stream, the PVRA information comprising an indication of a first tier number corresponding uniquely to the pictures associated with a first tier and a second tier number corresponding uniquely to the pictures associated with a second tier different than the first tier;

responsive to a request for a first trick mode, decoding a first sub-sequence of pictures beginning at one of the pictures corresponding to a random access point (RAP)

and consisting of the pictures of the sequence signaled by the PVRA information as the first tier number; and responsive to a request for a second trick mode that has a different playback speed than the first trick mode, decoding a second sub-sequence beginning at the one of the pictures corresponding to a RAP and consisting of all of the pictures of the sequence signaled as the first tier number, and one or more of the pictures of the sequence signaled by the PVRA information as the second tier number, the pictures corresponding to the first tier number decodable independently of the pictures corresponding to the second tier number, wherein for all values of k, where a lowest tier number≦k≦a highest tier number, wherein receiving the PVRA information comprises receiving a tier number signaled for a decodable Tier k picture located between an rth and (r+1)th RAP of a decodable sub-sequence, the respective tier number signaled for all tiers including the lowest tier number through Tier k pictures that are located between a Tier k picture's DEP and the (r+1)th RAP.

2. The method of claim 1, further comprising initiating decoding at a decodability entry point (DEP) at a RAP corresponding to an rth RAP if the picture associated with the rth RAP is an instantaneous decode refresh (IDR) picture, otherwise the DEP is at the (r−1)th RAP corresponding to a RAP location immediately preceding the rth RAP, where r is a non-negative integer number.

3. The method of claim 1, wherein for all values of k, where a lowest tier number≦k≦a highest tier number, and wherein for an interval demarcated by a Tier k picture's DEP and the Tier k picture, the tier number signaled for the Tier k picture, prohibiting the Tier k picture from belonging to a decodable sub-sequence unless the tier number is signaled for all RAP pictures present in the interval and at least one picture corresponding to each of the respective tiers from the lowest tier number to Tier k−1.

4. The method of claim 3, wherein responsive to prohibiting a picture from belonging to the decodable sub-sequence, discarding the prohibited picture as a discardable picture.

5. The method of claim 1, wherein for all values of k, where a lowest tier number≦k≦a highest tier number, further comprising receiving PVRA information corresponding to pictures signaled as highest tier number pictures and one tier number lower than the highest tier number pictures, and responsive thereto, discarding the pictures corresponding to the one tier number lower than the highest tier number pictures if the pictures corresponding to the highest tier number pictures and the one tier number lower than the highest tier number pictures are discarded between a Tier k picture's DEP and a next RAP that contains an IDR picture.

6. The method of claim 1, further comprising, responsive to receiving a picture that signals a memory management control operation (MMCO) affecting an order of reference pictures, optionally decoding the picture and processing a slice layer corresponding to the picture.

7. A method, comprising:
providing a transport stream including a video stream that comprises a sequence of pictures corresponding to a video program, each of the pictures of the sequence uniquely associated with one of k successive tiers, where k is a non-negative integer number starting with a lowest tier number;
decoding the video stream using personal video recording assist (PVRA) information in the transport stream at each of the pictures of the sequence associated with a first tier and each of the pictures of the sequence associated with a second tier different than the first tier, the PVRA information comprising an indication of a first tier number corresponding uniquely to the pictures associated with the first tier and a second tier number corresponding uniquely to the pictures associated with the second tier, the pictures corresponding to the first tier number decodable independently of the pictures corresponding to the second tier number; and
signaling discardable pictures by omitting a tier number for the respective discardable picture corresponding to pictures of a highest tier, the discardable pictures further including pictures associated with a tier having one tier number lower than the highest tier.

8. The method of claim 7, wherein for all values of k, where a lowest tier number≦k≦a highest tier number, wherein providing the PVRA information comprises providing a tier number that signals a decodable Tier k picture located between an rth and (r+1)th RAP of a decodable sub-sequence, the respective tier number signaled for all tiers including the lowest tier number through Tier k pictures that are located between a Tier k picture's decodability entry point (DEP) and the (r+1)th RAP, the DEP defined to be at the rth RAP if the picture associated with the rth RAP is an instantaneous decode refresh (IDR) picture, otherwise the DEP is at the (r−1)th RAP corresponding to a RAP location immediately preceding the rth RAP, where r is a non-negative integer number.

9. The method of claim 7, wherein for all values of k, where a lowest tier number≦k≦a highest tier number, further comprising providing PVRA information corresponding to pictures signaled as highest tier number pictures and one tier number lower than the highest tier number pictures, and responsive thereto, enabling the discarding the pictures corresponding to the one tier number lower than the highest tier number pictures if the pictures corresponding to the highest tier number pictures and the one tier number lower than the highest tier number pictures are discarded between a Tier k picture's DEP and a next RAP that contains an IDR picture.

10. A system, comprising:
a video stream receive-and-process (VSRP) device, comprising:
a memory with personal video recording (PVR) logic; and
a processor configured with the PVR logic to:
receive a transport stream that includes a video stream that comprises a sequence of pictures corresponding to a video program, each of the pictures of the sequence uniquely associated with one of k successive tiers, where k is a non-negative integer number starting with a lowest tier number;
receive personal video recording assist (PVRA) information in the transport stream, the PVRA information comprising an indication of plural tier numbers, each tier number uniquely associating each one of the pictures with a respective tier number; and
responsive to a request for a trick mode, initiating decoding at a decodability entry point (DEP) at a random access point (RAP) corresponding to an rth RAP if the picture associated with the rth RAP is an instantaneous decode refresh (IDR) picture, otherwise the DEP is at the (r−1)th RAP corresponding to a RAP location immediately preceding the rth RAP, where r is a non-negative integer number, wherein for all values of k, where a lowest tier number≦k≦a highest tier number, and wherein for an interval demarcated by a Tier k picture's DEP and the Tier k picture, the tier number signaled for the Tier k picture, the processor is further configured with the PVR logic to prohibit the Tier k picture from belonging to a decodable sub-sequence unless the tier number is signaled for all RAP pictures present in the interval and at least one picture corresponding to each of the respective tiers from the lowest tier number to Tier k−1.

11. The system of claim 10, wherein for all values of k, where a lowest tier number≦k≦a highest tier number, wherein the processor is further configured with the PVR logic to receive a tier number signaled for a decodable Tier k picture located between an rth and (r+1)th RAP of a decodable sub-sequence, the respective tier number signaled for all tiers including the lowest tier number through Tier k pictures that are located between a Tier k picture's DEP and the (r+1)th RAP.

12. The system of claim 10, wherein responsive to prohibiting a picture from belonging to the decodable sub-sequence, the processor is further configured with the PVR logic to discard the prohibited picture as a discardable picture.

13. The system of claim 12, wherein for all values of k, where a lowest tier number≦k≦a highest tier number, wherein the processor is further configured with the PVR logic to receive PVRA information corresponding to pictures signaled as highest tier number pictures and one tier number lower than the highest tier number pictures, and responsive thereto, discard the pictures corresponding to the one tier number lower than the highest tier number pictures if the pictures corresponding to the highest tier number pictures and the one tier number lower than the highest tier number pictures are discarded between a Tier k picture's DEP and a next RAP that contains an IDR picture.

14. The system of claim 12, wherein the processor is further configured with the PVR logic to, responsive to receiving a picture that signals a memory management control operation (MMCO) affecting an order of reference pictures, optionally decode the picture and process a slice layer corresponding to the picture.

15. The system of claim 10, further comprising a video stream emitter (VSE), the VSE comprising a processor configured to provide the transport stream and the PVRA information.

16. The system of claim 15, wherein the VSE is further configured to signal a discardable picture by omitting a tier number for the discardable picture.

* * * * *